(12) United States Patent
Lin (10) Patent No.: US 12,395,646 B2
(45) Date of Patent: Aug. 19, 2025

(54) METHOD, APPARATUS, ELECTRONIC DEVICE, STORAGE MEDIA AND PROGRAM PRODUCT FOR VIDEO CODING

(71) Applicant: Beijing Baidu Netcom Science Technology Co., Ltd., Beijing (CN)

(72) Inventor: Ke Lin, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 0 days.

(21) Appl. No.: 18/748,870

(22) Filed: Jun. 20, 2024

(65) Prior Publication Data
US 2024/0430449 A1  Dec. 26, 2024

(30) Foreign Application Priority Data
Nov. 6, 2023  (CN) .......................... 202311466140.3

(51) Int. Cl.
*H04N 19/167* (2014.01)
*H04N 19/136* (2014.01)
*H04N 19/142* (2014.01)
*H04N 19/42* (2014.01)

(52) U.S. Cl.
CPC ......... *H04N 19/167* (2014.11); *H04N 19/136* (2014.11); *H04N 19/142* (2014.11); *H04N 19/42* (2014.11)

(58) Field of Classification Search
CPC .. H04N 19/136; H04N 19/142; H04N 19/167; H04N 19/42
See application file for complete search history.

(56) References Cited

U.S. PATENT DOCUMENTS

| | | | |
|---|---|---|---|
| 2011/0200302 A1* | 8/2011 | Hattori ................. | H04N 13/156 386/290 |
| 2016/0112710 A1* | 4/2016 | Park ...................... | H04N 19/16 375/240.25 |
| 2017/0155918 A1* | 6/2017 | Lin ....................... | H04N 19/172 |

* cited by examiner

*Primary Examiner* — Md N Haque
(74) *Attorney, Agent, or Firm* — Ice Miller LLP; Justin Swindells (57) ABSTRACT

The present disclosure provides a method and apparatus for coding a video, an electronic device, a storage medium, and a program product. The method includes: determining a to-be-coded target video based on an acquired video coding request; calling, for each video frame arranged in chronological order constituting the target video, a preset subtitle detection operator periodically to detect subtitle information in the corresponding video frame, where, the subtitle detection operator is a neural network constructed based on a deep learning algorithm for recognizing the subtitle information in the video, the subtitle information including: the number of subtitle frames, a position of the subtitle frame, and subtitle content; and determining a picture region for presenting the subtitle information as a region of interest, and performing coding processing according to a video coding method matching the region of interest.

18 Claims, 4 Drawing Sheets

METHOD, APPARATUS, ELECTRONIC DEVICE, STORAGE MEDIA AND PROGRAM PRODUCT FOR VIDEO CODING

CROSS-REFERENCE TO RELATED APPLICATIONS

This application claims priority to Chinese Patent Application No. 202311466140.3, filed with the China National Intellectual Property Administration (CNIPA) on Nov. 6, 2023, the contents of which are incorporated herein by reference in their entirety.

TECHNICAL FIELD

The present disclosure relates to the technical field of data processing, in particular to the technical field such as video coding, or deep learning, and more particularly, to a method and apparatus for coding a video, an electronic device, a computer readable storage medium, and a computer program product.

BACKGROUND

ROI (Region of Interest) technology, that is, recognizes a region of interest to human eyes in a video, and targeted optimizes bit rate allocation and a coding mode in the region, in order to achieve the purpose of significantly improving a subjective quality.

Recognition of various types of regions of interest in a video is one of the most critical parts. Among the regions of interest, subtitle is a very important region in the video, and the human eyes pay attention to subtitles in both variety shows and films that include characters and in documentaries that do not include characters. If the subtitle has the problem of coding distortion, such as blurring or misalignment, it may greatly affect user experience.

Therefore, in an encoder for coding a video, regions of interest, such as subtitle regions, need to be targeted recognized, to facilitate targeted coding of the recognized regions of interest.

SUMMARY

Embodiments of the present disclosure propose a method and apparatus for coding a video, an electronic device, a computer readable storage medium, and a computer program product.

In a first aspect, an embodiment of the present disclosure proposes a method for coding a video, including: determining a to-be-coded target video based on an acquired video coding request; calling, for each video frame arranged in chronological order constituting the target video, a preset subtitle detection operator periodically to detect subtitle information in the corresponding video frame; where, the subtitle detection operator is a neural network constructed based on a deep learning algorithm for recognizing the subtitle information in the video, the subtitle information including: the number of subtitle frames, a position of the subtitle frames, and subtitle content; and determining a picture region for presenting the subtitle information as a region of interest, and performing coding processing according to a video coding method matching the region of interest.

In a second aspect, an embodiment of the present disclosure proposes an apparatus for coding a video, including: a target video determination unit, configured to determine a to-be-coded target video based on an acquired video coding request; an operator periodic calling unit, configured to call, for each video frame arranged in chronological order constituting the target video, a preset subtitle detection operator periodically to detect subtitle information in a corresponding video frame; wherein, the subtitle detection operator is a neural network constructed based on a deep learning algorithm for recognizing the subtitle information in a video, the subtitle information comprising: a number of subtitle frames, a position of the subtitle frames, and subtitle content; and a region of interest determination and targeted coding unit, configured to determine a picture region for presenting the subtitle information as a region of interest, and perform coding processing according to a video coding method matching the region of interest.

In a third aspect, embodiments of the present disclosure provide an electronic device, comprising: one or more processors; and a memory, storing one or more programs, wherein the one or more programs, when executed by the one or more processors, cause the one or more processors to implement the method for coding a video provided by the first aspect.

In a fourth aspect, embodiments of the present disclosure provide a computer readable storage medium, storing a computer program thereon, wherein the program, when executed by a processor, causes the processor to implement the method for coding a video provided by the first aspect.

In a fifth aspect, an embodiment of the present disclosure provides a computer program product, comprising a computer program, wherein the computer program, when executed by a processor, implements the method for coding a video provided by the first aspect.

It should be understood that the content described in this section is not intended to identify critical or important features of embodiments of the present disclosure, and is not used to limit the scope of the present disclosure. Other features of the present disclosure will become readily comprehensible through the following description.

BRIEF DESCRIPTION OF THE DRAWINGS

Other features, objectives, and advantages of the present disclosure will become more apparent from the following detailed description of non-limiting embodiments with reference to the accompanying drawings.

DETAILED DESCRIPTION OF EMBODIMENTS

Exemplary embodiments of present disclosure are described below with reference to the accompanying drawings, which include various details of the embodiments of the present disclosure to facilitate understanding, and should be considered as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description. It should be noted that, embodiments in the present disclosure and features in the embodiments may be combined with each other on a non-conflict basis.

In the technical scheme of the present disclosure, the collection, storage, use, processing, transmission, provision and disclosure of the user's personal information are processed in accordance with relevant laws and regulations, and do not violate public order and good customs.

Figure 1:
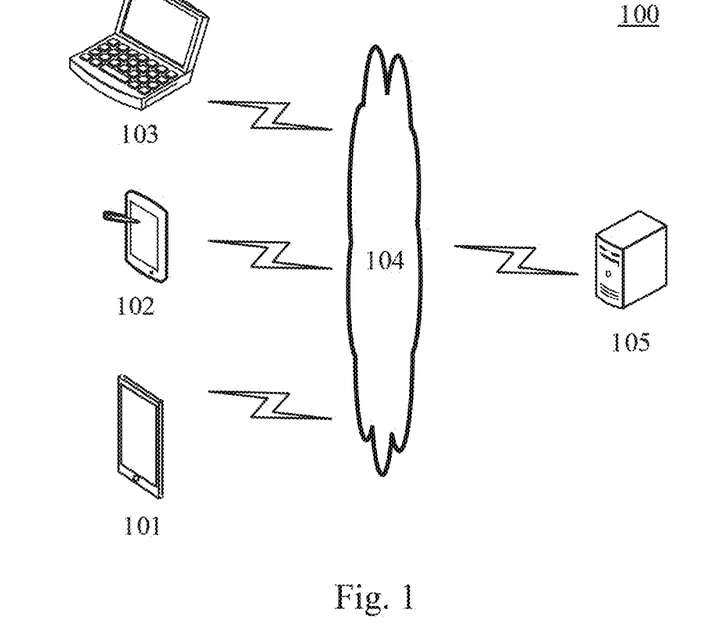
FIG. 1 is an exemplary system architecture to which the present disclosure may be applied.

FIG. 1 illustrates an exemplary system architecture 100 to which embodiments of a method and apparatus for coding a video, an electronic device, and a computer readable storage medium of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connection, for example, wired or wireless communication links, or optical fiber cables.

A user may use the terminal devices 101, 102 and 103 to interact with the server 105 via the network 104, to receive or send messages, etc. The terminal devices 101, 102, 103 and the server 105 may be installed with various applications for realizing information communication between the two, such as a video coding application, a streaming media resource online on-demand application, or an instant messaging application.

The terminal devices 101, 102, 103 and the server 105 may be hardware or software. When the terminal devices 101, 102, 103 are hardware, they may be a variety of electronic devices having a display screen, including but not limited to, a smartphone, a tablet, a laptop, a desktop computer, or the like. When the terminal devices 101, 102, 103 are software, they may be installed in the electronic devices listed above. The terminal devices 101, 102, 103 may be implemented as a plurality of software or software modules, or as a single software or software module, which will not be limited herein. When the server 105 is hardware, it may be implemented as a distributed server cluster consisting of a plurality of servers, or as a single server; when the server is software, it may be implemented as a plurality of software or software modules, or as a single software or software module, which will not be limited herein.

The terminal devices 101, 102, 103 may provide various services by means of various built-in applications, taking a video coding application that can provide video coding services as an example, the terminal devices 101, 102, 103 may achieve the following effects when running the video coding application: first, determining a to-be-coded target video based on an acquired video coding request; then, calling, for each video frame arranged in chronological order constituting the target video, a preset subtitle detection operator periodically to detect subtitle information in the corresponding video frame; where, the subtitle detection operator is a neural network constructed based on a deep learning algorithm for recognizing the subtitle information in the video, the subtitle information including: the number of subtitle frames, a position of the subtitle frame, and subtitle content; and finally, determining a picture region for presenting the subtitle information as a region of interest, and performing coding processing according to a video coding method matching the region of interest.

The server 105 may provide various services by means of various built-in applications, taking a video coding application that can provide video coding services as an example, the server 105 may achieve the following effects when running the video coding application: first, receiving an incoming coding request for a target video via the network 104 from the terminal devices 101, 102, 103, and determining the to-be-coded target video based on the coding request; then, calling, for each video frame arranged in chronological order constituting the target video, a preset subtitle detection operator periodically to detect subtitle information in the corresponding video frame; where, the subtitle detection operator is a neural network constructed based on a deep learning algorithm for recognizing the subtitle information in the video, the subtitle information including: the number of subtitle frames, a position of the subtitle frame, and subtitle content; and finally, determining a picture region for presenting the subtitle information as a region of interest, and performing coding processing according to a video coding method matching the region of interest. Finally, the coding processing result may be stored in a corresponding storage unit in preparation for sending the coding result in the storage unit to the corresponding terminal device via the network 104 in case a user initiates a playback request for the target video in the future, so as to facilitate the terminal device to perform a decoding operation thereon to present a corresponding video picture.

It should be noted that the video coding request, in addition to being acquired from the terminal devices 101, 102, 103 via the network 104, may also be pre-stored locally in the server 105 using various methods. Therefore, when the server 105 detects that such data is already stored locally (e.g., start processing a to-be-processed video coding task previously kept), it may choose to acquire such data directly from the local, in this case, the exemplary system architecture 100 may also exclude the terminal devices 101, 102, 103 and the network 104.

Since targeted coding of video data requires occupying many computing resources and strong computing power, the method for coding a video provided in subsequent embodiments of the present disclosure is generally performed by the server 105 having strong computing power and many computing resources, and accordingly, the apparatus for coding a video is generally provided in the server 105. However, it should also be noted that when the terminal devices 101, 102, 103 also have computing power and computing resources that satisfy the requirements, the terminal devices 101, 102, 103 may also complete the above calculations that are handed over to the server 105 by the video coding application installed thereon, and thus output the same result as the server 105. In particular, in the case there are simultaneously a plurality of terminal devices having different computing powers, but the terminal device on which the video coding application is installed has strong computing power and many computing resources remaining, the terminal device may be allowed to perform the aforementioned calculations, thereby appropriately reducing computing pressure on the server 105, and accordingly, the apparatus for coding a video may be provided in the terminal devices 101, 102, 103. In this case, the exemplary system architecture 100 may also exclude the server 105 and the network 104.

It should be appreciated that the numbers of the terminal devices, the networks and the servers in FIG. 1 are merely illustrative. Any number of terminal devices, networks and servers may be provided depending on implementation needs.

Figure 2:
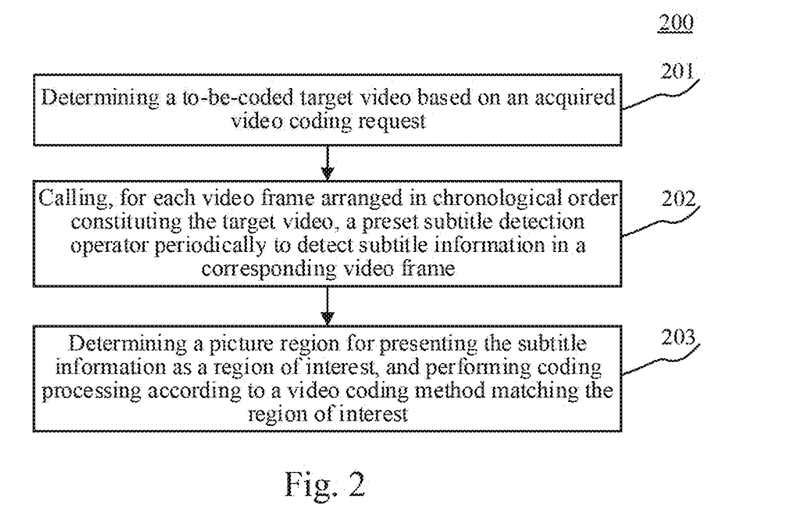
FIG. 2 is a flowchart of a method for coding a video provided in an embodiment of the present disclosure.

Referring to FIG. 2, FIG. 2 is a flowchart of a method for coding a video provided in an embodiment of the present disclosure, where a flow 200 includes the following steps:

Step 201: determining a to-be-coded target video based on an acquired video coding request.

This step is intended to determine, by an executing body of the method for coding a video (e.g., the server 105 shown in FIG. 1) based on the acquired video coding request, the target video for which coding is requested by the coding request, so as to facilitate coding processing on raw image data constituting the target video, after the to-be-coded target video is determined.

The acquisition of the video coding request may involve a request proposed by a user via a search term, a voice command, a button click, or other means. In particular, the video coding request may be a coding request initiated by a backend administrator of a video-on-demand platform on its backend administration server for a certain type of newly stored film or television production files.

Step 202: calling, for each video frame arranged in chronological order constituting the target video, a preset subtitle detection operator periodically to detect subtitle information in the corresponding video frame.

On the basis of step 201, this step is intended to call the preset subtitle detection operator periodically to detect the subtitle information in the corresponding video frame by the executing body, for each video frame arranged in chronological order constituting the target video. The subtitle detection operator is a neural network constructed based on a deep learning algorithm for recognizing the subtitle information in the video, and the subtitle information may include: the number of subtitle frames, a position of the subtitle frame and subtitle content, and other subtitle-related information. In particular, typically, every preset image frames or every preset duration may be used as a period. For example, calling the subtitle detection operator once every 4 frames, or calling the subtitle detection operator once every 0.2 seconds for the video frame of a corresponding moment.

Compared to conventional subtitle detection algorithms based on characteristics such as edges, variance, or motion, the present embodiment chooses to use the subtitle detection operator obtained by constructed based on the neural network to detect the subtitle information, mainly because it is obtained from training using a large number of subtitle frame labeled images, and is capable of returning possible number of subtitle frames and coordinates, for an input frame of to-be-detected image, has a good single-frame detection effect, however, its main drawback is high detection time consumption, which makes it impossible to call the subtitle detection operator to detect the subtitle information in consecutive each video frame, resulting in a lot of performance overheads along with missed detections. Therefore, the present disclosure is intended to solve this problem by proposing to call the preset subtitle detection operator periodically to detect the subtitle information presented in a playback window, i.e., instead of calling the subtitle detection operator to detect the subtitle information in the current frame in consecutive each video frame, the subtitle detection operator is called only once every period of time to detect the subtitle information with high accuracy, taking into account the retention and timeliness of the subtitle content, thereby ensuring a detection accuracy while reducing unnecessary performance overhead.

The specific period of time as an interval between two consecutive calls to the subtitle detection operator may be flexibly formulated according to the actual situation, and even for the same target video, the duration of the period at different moments may be different. For example, a length of the presented subtitle content detected by the last call to the subtitle detection operator may be dynamically combined to adjust an interval duration of a next call to the subtitle detection operator, for example, the longer the length of the subtitle content detected by the last call, the more time it takes for a viewer to watch the subtitle content, and the longer it takes for a film or television production to finish presenting the subtitle content, the time interval until the next call to the subtitle detection operator may be dynamically set to a long duration that matches the length of the subtitle content, and vice versa to a slightly shorter duration.

Step 203: determining a picture region for presenting the subtitle information as a region of interest, and performing coding processing according to a video coding method matching the region of interest.

On the basis of step 202, this step is intended to determine the picture region for presenting the subtitle information as the region of interest, and to perform coding processing according to the video coding method matching the region of interest by the executing body.

It should be understood that the reason why the picture region for presenting the subtitle information is determined as the region of interest is precisely that a related image region containing the subtitle is the region to which the user pays more attention when watching the video, therefore, in order to enhance the user's viewing experience, coding of image content in the region of interest should use a coding method that adopts a high bit rate and can present a clear and smooth viewing effect, that is, the video coding method pre-configured for the region of interest should also be a coding method of a high bit rate and can present a clear and smooth viewing effect, conversely, for a region of non-interest, a coding method that adopts a lower bit rate compared to the region of interest, and can present a general viewing effect should be used.

A specific implementation including and not limited to may be: determining a high coding code rate exceeding a preset code rate pre-configured for the region of interest, and performing coding processing on the region of interest according to the high coding code rate to obtain a region of interest coding result. Further, in order to finally be able to present a complete video picture, it is also possible to determine, in a subsequent session, a low coding code rate not exceeding the preset code rate pre-configured for the region of non-interest, and perform coding processing on the region of non-interest according to the low coding code rate to obtain a region of non-interest coding result, and finally combine the corresponding region of interest coding result and the region of non-interest coding result according to a regional positional relationship between the region of interest and the region of non-interest, to obtain a complete coding result that can be presented as the complete video picture by a decoding operation.

The method for coding a video provided by embodiments of the present disclosure, for the to-be-coded target video, does not call the subtitle detection operator constructed based on the neural network algorithm to perform high-accurate recognition and detection on the subtitle information in each video frame, but fully considers the timeliness and continuous existence of subtitle content presentation, and calls the subtitle detection operator periodically to detect the subtitle information presented in the current video frame using a spaced, frame-extracting method, thereby reducing unnecessary performance overhead caused by continuous and repeated calling the subtitle detection operator, which is conducive to freeing up more performance for targeted coding of the region presenting the subtitle information, thus enhancing the user's viewing experience during subsequent actual on-demand playback of the video.

Figure 3:
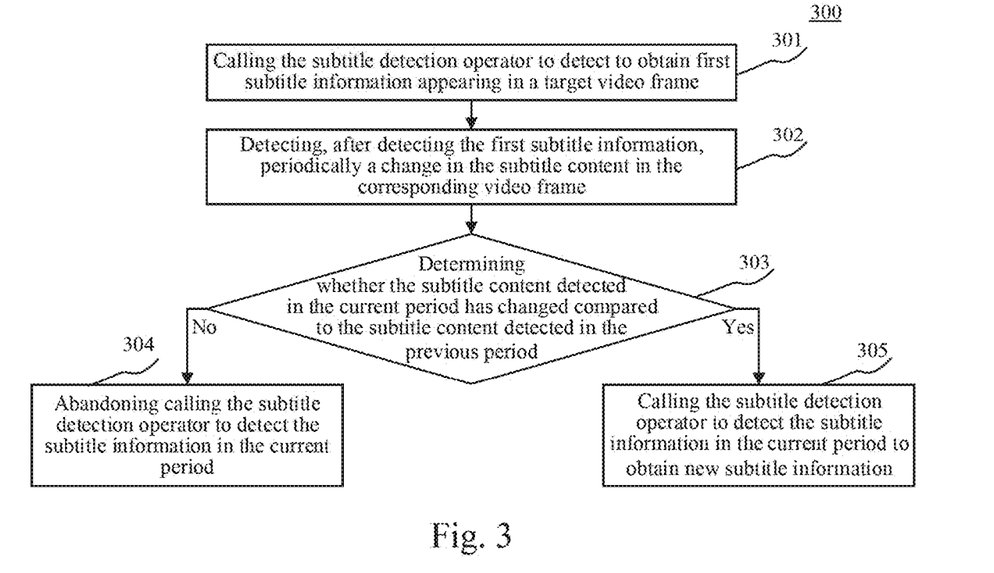
FIG. 3 is a flowchart of a method for calling a subtitle detection operator periodically to detect subtitle information provided in an embodiment of the present disclosure.

To further deepen the understanding of how to implement the process of calling the subtitle detection operator periodically described in step 202, the present embodiment also illustrates, by way of FIG. 3, a specific implementation of a flow 300, including the following steps:

Step 301: calling the subtitle detection operator to detect to obtain first subtitle information appearing in a target video frame.

This step is intended to call the subtitle detection operator to detect to obtain the first subtitle information appearing in the target video frame by the executing body. It should be understood that the first subtitle information is subtitle information first appearing in the video picture of the target video. If the subtitle appears in a first video frame constituting the target video, then the first video frame is the target video frame, if the subtitle appears for the first time in a video frame corresponding to a 20-second moment in the corresponding playback, then the video frame corresponding to the 20-second moment is the target video frame, i.e., consideration should be given to part of video frames that do not contain the subtitle information. For many video frames appearing prior to the first subtitle information, if the subtitle detection operator is called to detect whether the first subtitle information appears in each frame, first, it is not possible due to high detection time consumption, and secondly, it may also lead to high performance overhead, therefore, the subtitle detection operator may be called as frequently as possible in the first few image frames of the target video to detect the subtitle information, if the number of detected subtitle frames is 0 and no subtitle content appears, the subtitle detection operator may be called again after an interval duration, and if still no subtitle frame is detected, the interval duration may even be increased further to call the subtitle detection operator as few times as possible.

Step 302: detecting, after detecting the first subtitle information, periodically a change in the subtitle content in the corresponding video frame.

On the basis of step 301, this step is intended to detect, by the executing body, after detecting the first subtitle information, the change in the subtitle content in the corresponding video frame, only periodically using the conventional detection algorithm (e.g., a detection algorithm for calculating a sum of absolute differences of pixel blocks constituting a region image) since then with low detection time consumption and low performance overhead, i.e., detecting whether the subtitle content in the subtitle information appearing in a previous period has changed compared to the subtitle content in the subtitle information appearing in a current period.

Step 303: determining whether the subtitle content detected in the current period has changed compared to the subtitle content detected in the previous period, if no change occurs, perform step 304, or if a change occurs, perform step 305.

Step 304: abandoning calling the subtitle detection operator to detect the subtitle information in the current period; and This step is based on the fact that in step 303 it is determined that the subtitle content detected in the current period has not changed compared to the subtitle content detected in the previous period, i.e., the subtitle content in the previous period is the same as the subtitle content in the current period, that is, the previous subtitle content is still in effect, and it has not yet been replaced with a next subtitle content, therefore, in the case where the subtitle information has not changed, the executing body may detect the subtitle information by abandoning calling the subtitle detection operator that takes a long time to detect and requires high performance overhead in the current period, so as to reduce the performance overhead while ensuring the accuracy of subtitle information detection.

Step 305: calling the subtitle detection operator to detect the subtitle information in the current period to obtain new subtitle information.

This step is based on the fact that in step 303 it is determined that the subtitle content detected in the current period has changed compared to the subtitle content detected in the previous period, i.e., the subtitle content in the previous period is inconsistent with the subtitle content in the current period, that is, the previous subtitle content has become invalid and has been replaced with another subtitle content, therefore, in the case where the subtitle information has changed, the executing body should call the subtitle detection operator once to detect the latest subtitle information in the current period, so as to ensure the accuracy of subtitle information detection.

That is, the present embodiment provides, by steps 301-305, a solution of calling the subtitle detection operator periodically to detect the subtitle information, i.e., after obtaining the accurate first subtitle information by calling the subtitle detection operator, change detection on the subtitle content is performed periodically only based on the conventional detection algorithm with low detection time consumption and low performance overhead, thus, by paying small price, it may be determined whether the subtitle information has changed, and abandoning calling the subtitle detection operator in the current period when no change occurs, and maintaining the behaviour of calling the subtitle detection operator in the current period only when it is determined that the change occurs, in order to minimize unnecessary calls to the subtitle detection operator, thus, the performance overhead may be reduced as much as possible, while ensuring the accuracy of subtitle information detection.

In order to further deepen the understanding of how to implement the change of the subtitle content periodically in step 302, a first detection period may also be used herein as an example to describe the specific implementation process:

For example, first extracting from the first subtitle information a first subtitle frame and first subtitle content appearing in a region framed by the first subtitle frame, then acquiring actual subtitle content appearing in a position framed by the first subtitle frame in the current video frame, after a period duration after detecting the first subtitle information, and then detecting whether the subtitle content appearing in the framed region within the first subtitle frame in the video frame corresponding to the current period has changed compared to the first subtitle content.

Figure 4:
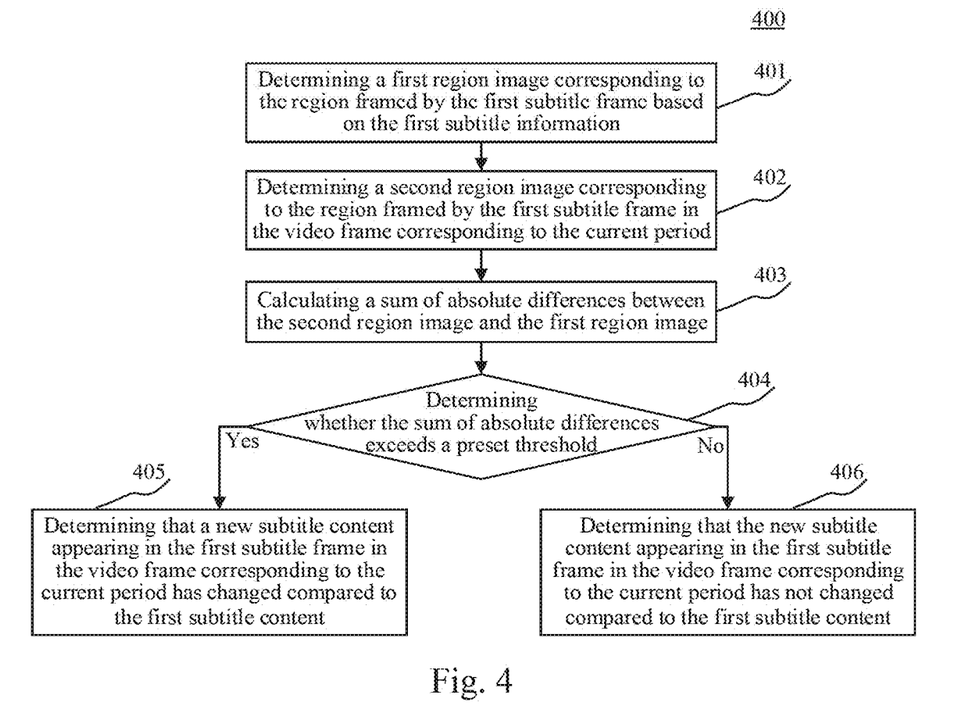
FIG. 4 is a flowchart of a method for detecting whether subtitle content has changed provided in an embodiment of the present disclosure.

With respect to this process, reference may also be made in particular to FIG. 4, illustrating a method for calculating whether the subtitle content has changed using a sum of absolute differences algorithm, where a flow 400 includes the following steps:

Step 401: determining a first region image corresponding to the region framed by the first subtitle frame based on the first subtitle information.

Step 402: determining a second region image corresponding to the region framed by the first subtitle frame in the video frame corresponding to the current period.

Step 403: calculating a sum of absolute differences between the second region image and the first region image.

SAD (Sum of Absolute Differences) technology is a technology for calculating a degree of difference between different frames of image pictures in a fixed region in a video, which may also be understood as a method for measuring a difference between two images, and may be used to detect motion or to compare content changes between different frames. General steps of calculating a SAD value in a fixed region in a video may be:

1) Selecting the fixed region.

First, it is necessary to explicitly define in which region of the video frame the SAD value is desired to be calculated. This region is usually a rectangle or a square, which may be defined by specifying the coordinates of its upper-left and lower-right corners, in the present embodiment, the region is a region framed by the first subtitle frame in the first subtitle information.

2) Acquiring two frames of images respectively, i.e., a frame of image in which the first subtitle information appears and a frame of image in the current period.

3) Calculating the SAD value.

For each pair of image frames, perform operations as follows: a. extracting the same region, i.e., the fixed region, in both of the image frames; b. calculating a pixel-by-pixel difference for each pixel in the two regions; c. taking an absolute value of the difference of each pixel, then adding up all the differences to obtain the SAD value. Of course, other calculation methods that can achieve similar effects may also be chosen and are not listed herein.

Step 404: determining whether the sum of absolute differences exceeds a preset threshold, if yes, perform step 405, otherwise perform step 406.

Step 405: determining that a new subtitle content appearing in the first subtitle frame in the video frame corresponding to the current period has changed compared to the first subtitle content.

That is, in this step, it is considered that the pixel information in the region framed by the first subtitle frame has changed significantly between the two image frames, since the calculated sum of absolute differences exceeds the preset threshold, and therefore, it may be determined that the new subtitle content appearing in the first subtitle frame in the current period has changed compared to the first subtitle content.

Step 406: determining that the new subtitle content appearing in the first subtitle frame in the video frame corresponding to the current period has not changed compared to the first subtitle content.

That is, in this step, it is considered that the pixel information in the region framed by the first subtitle frame has not changed significantly between the two image frames, since the calculated sum of absolute differences does not exceed the preset threshold, and therefore, it may be determined that the new subtitle content appearing in the first subtitle frame in the current period has not changed compared to the first subtitle content, that is, the odds are that the subtitle content has remained consistent.

The present embodiment provides, by steps 401-406, an implementation that uses the sum of absolute differences to calculate whether the subtitle content has changed, enabling quick confirmation of whether the subtitle information has changed at a small computational cost, so as to determine whether to call the subtitle detection operator for accurate detection of the subtitle information in the current period.

Figure 5:
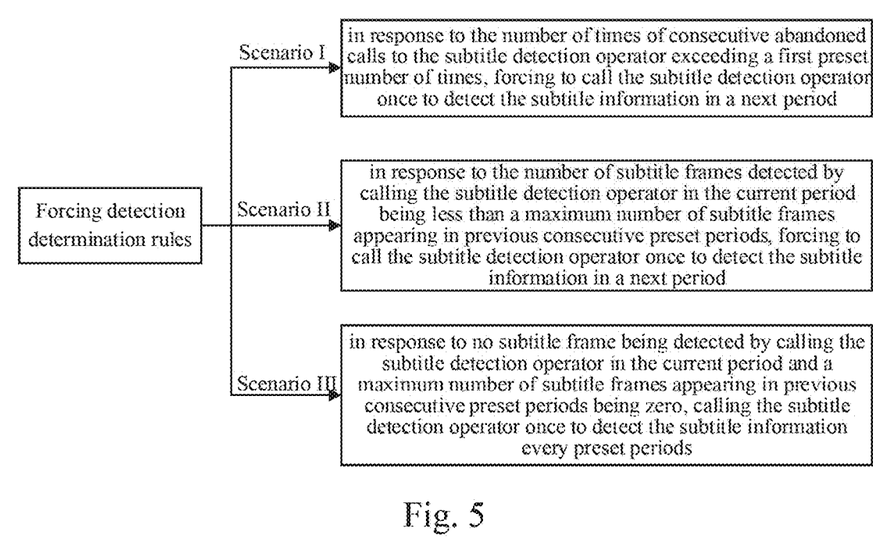
FIG. 5 is a schematic diagram of a forcing detection rule and periodic adjustment method of provided in an embodiment of the present disclosure.

On the basis of any of the above embodiments, it is considered that some problems of missed detection may arise in multi-subtitle scenarios. For example, if the operator detects a TV station logo which is always unchanged in the upper left corner and keeps skipping detection, a newly appearing dialogue subtitle below may be missed. Another example is continuous dialogue subtitles, where the previous subtitle disappears and the next subtitle appears in less than 10 frames, which needs to be detected in time. Therefore, some forcing detection determination rules may also be added, referring to Scenario I, Scenario II and Scenario III shown in FIG. 5:

Scenario I: if the number of times of consecutive abandoned calls to the subtitle detection operator exceeds a first preset number of times, forcing to call the subtitle detection operator once to detect the subtitle information in a next period, so as to avoid the situation of missed detection due to new subtitles appearing in other positions that cannot be detected.

Scenario II: in response to the number of subtitle frames detected by calling the subtitle detection operator in the current period being less than a maximum number of subtitle frames appearing in previous consecutive preset periods, forcing to call the subtitle detection operator once to detect the subtitle information in a next period. The preset periods may be set to 10 periods or even 20 periods, and since it is the current period that is compared to the maximum number of subtitle frames in multiple periods prior to the current period, once a less-than situation occurs, the act of forcing to call the subtitle detection operator to detect the subtitle information in the next period may persist for up to a preset number of new periods thereafter, avoiding the problem of not being able to detect in time caused by at least one of multiple subtitles disappearing for a while but not knowing when it may appear again.

Scenario III: in response to no subtitle frame being detected by calling the subtitle detection operator in the current period and a maximum number of subtitle frames appearing in previous consecutive preset periods being zero, calling the subtitle detection operator once to detect the subtitle information every preset periods. That is, this scenario is actually for consecutive no-subtitle scenarios, then there is no need to detect the subtitle content according to the original period, but only need to force to detect once every more periods.

To deepen the understanding, the present disclosure also gives a complete and specific implementation scheme using a specific application scenario as an example:

The conventional method of subtitle detection based on the neural network, although the detection effect is good, due to its high time-consuming in single-frame detection, it can only perform detection at every certain number of frames, and if the interval is long, it may not be possible to detect the change or disappearance of subtitles in time, or if the interval is short, it may not be possible to reduce overall detection time consumption.

In order to solve the above problem, the present embodiment starts from a frame-extracting method of subtitle detection, and makes use of the characteristic of subtitle time-domain continuity to avoid meaningless calls to the subtitle detection operator: on the one hand, the subtitle is generally maintained in a fixed position for more than 1 second, when no change in the subtitle is determined in the middle, it is actually unnecessary to call the subtitle detection operator for accurate detection of the subtitle information; on the other hand, when the subtitle switches, it is also necessary to call the detection operator in time to detect a new subtitle frame, or appearance of the subtitle in other position. The specific scheme is described and elaborated as follows:

1. Subtitle adaptive frame-extracting detection flow.

The present embodiment is a frame-extracting detection optimization for subtitle detection based on fixed small interval and the neural network. Set the fixed interval to K, and determine "detection timing" once every K frames. K may be 5, and the specific size may be set according to speed requirements of the video coding scenario. K=1, then determine whether to call the detection operator in every frame, K=5, then determine whether to call the detection operator once every 5 frames, i.e., determine whether to call the subtitle detection operator only in the $0^{th}$, $5^{th}$, $10^{th}$, $15^{th}$ ... frame.

Each time the detection timing is determined, only in the $0^{th}$ frame it is bound to call the subtitle detection operator, and the other frames are required to satisfy a certain condition before calling the subtitle detection operator in the present disclosure. Each time the subtitle detection operator returns a result as the number of subtitle frames n (limited to a maximum value of 5), and the coordinates of each subtitle frame. Updating rules for the subtitle detection result are:

1) For a detection-timing frame, if the subtitle detection operator is called, updating the subtitle detection result.

(2) For a detection-timing frame, if the subtitle detection operator is not called, inheriting a last subtitle detection result.

3) For a non-detection timing frame, inheriting the last subtitle detection result.

If it is the basic fixed interval subtitle frame-extracting detection, the detection operator may be called at each "detection timing". The present embodiment focuses on the use of subtitle time-domain continuity, and adds the determination of whether to call the detection operator in the "detection timing" frame, so as to achieve the purpose of reducing a frequency of calling the operator and reducing the overall detection time consumption.

2. Determination of calling subtitle detection operator.

For a "detection timing" frame (frame sequence number modulo K is 0), strategies for determining whether to call the subtitle detection operator are as follows:

1) Skip calling the detection operator while the subtitle remains unchanged.

Since the subtitle of a TV series or a film usually maintains many frames, at each "detection timing", if the detection operator detected last time that the subtitle frame n>0, and determines that the subtitle is still unchanged in the current frame, calling the subtitle detection operator may be skipped and the last subtitle detection result may be inherited. The determination method is to use the SAD in the subtitle region in the detection frame and the current frame to compare with the threshold, and to determine whether the subtitle disappears or changes. The SAD must be small when the subtitle changes, and when the subtitle disappears or switches, the SAD is usually a large value due to large pixel difference between the subtitle and the background. The specific calculation may be:

a. A statistic range of the SAD is reduced to 8×8 lattice points for each subtitle frame, and inward by half to avoid too much inclusion of background pixels; b. Calculate the SAD of all 8×8 blocks of pixels in the region (which may be accelerated by assembly), take the average value, and take the maximum of a SAD result of each subtitle frame; c. If the SAD result is less than "8×8YUV Number of pixel points*threshold Th1", the threshold Th1 may be set to 20, skip calling the detection operator and inherit the last subtitle detection result.

2) Strategies for forcing to call the detection operator.

After applying the determination strategy in 1), some problems of missed detection may arise in multi-subtitle scenarios. For example, the operator detects the TV station logo which is always unchanged in the upper left corner and keeps skipping detection, and the newly appearing dialogue subtitle below may be missed. Another example is the continuous dialogue subtitles, where the previous subtitle disappears and the next subtitle appears in less than 10 frames, which needs to be detected in time. Therefore, some forcing detection determination rules may be added:

a. Some time has elapsed since the last call to the detection operator (5 detection timings or 1 second, taking the minimum value by the number of frames and assigning as threshold Th2), forcing to call the detection operator once. This is to avoid new subtitles appearing in other positions that cannot be detected, and the threshold Th2 is to allow a delay of new subtitle detection to be a maximum of 4 detection timings or less than 1 second.

b. If the number of subtitle frames detected last time is less than the maximum number of subtitle frames detected or inherited recently (20 detection timings or 2 s, taking the minimum value by the number of frames and assigning as threshold Th3), forcing detection. This is to avoid the disappearance of one sentence of the subtitle and the appearance of a next sentence can not be detected in time, subtitle switch in 20 detection timings or 2 seconds can be detected without delay. If the subtitle cannot be detected by frequent detections during this period of time, it is equivalent to a degradation to a) forcing detection, and the delay of new subtitle detection is a maximum of 4 detection timings or less than 1 second.

3) Skipping strategy for consecutive no-subtitle scenarios.

When no subtitle is detected, if the maximum number of subtitle frames detected or inherited recently is also 0, there is no need to call the operator every time, just wait for forcing detection. Pure no-subtitle scenario or a period of no-subtitle clip, is equivalent to a degradation to forcing detection of 5 detection timings or 1 second, reducing the number of times of detection by 80%. Even if the subtitle appears subsequently, it is only equivalent to the delay of a maximum of 4 detection timings or less than 1 second before the subtitle is detected.

3. Priority of determination rules for calling detection operator.

For a "detection timing" frame (frame sequence number modulo K is 0), there are three strategies with a total of four rules to determine whether to call the detection operator: the SAD calculation and determination of skipping detection rule in 1), the two forcing detection rules in 2), and the consecutive no-subtitle scenario skipping rule in 3). Their priorities are as follows in descending order:

Rule 1: The frame sequence number at the current detection timing is greater than or equal to Th2 from the last call to the detection operator frame sequence number, forcing to call the detection operator at the current detection timing.

Rule 2: If the number of subtitle frames detected or inherited last time is less than the maximum number of subtitle frames detected or inherited recently, forcing to call the detection operator at the current detection timing.

Rule 3: If the number of subtitle frames detected or inherited last time is 0, and the maximum number of subtitle frames detected or inherited recently is also 0 (i.e., Rule 2 is not triggered), skipping calling the detection operator at the current detection timing and inheriting the last result.

Rule 4: If the number of subtitle frames detected or inherited last time is not 0, and the SAD calculation determines that there is no change in the subtitle between the current frame and the last time actual detection frame, skipping calling the detection operator at the current detection timing and inheriting the last result.

In addition, the maximum number of subtitle frames detected or inherited recently is the maximum value of the number of subtitle frames detected or inherited within the last 20 detection timings or 2 seconds (taking the minimum value by the number of frames and assigning as Th3). Therefore, after each detection timing, the maximum number of subtitle frames detected or inherited recently within the range of Th3 needs to be updated.

It should be noted that the scheme provided in the present embodiment can be applied in encoders not limited to coding standards such as H.264, or H.265, and is used to determine the timing of calling the subtitle detection operator and reduce redundant subtitle detection calls. A good detection result can be achieved by combining the neural network-based subtitle detection operator. The generated subtitle detection result is applied to subsequent subtitle bit rate allocation and mode decision, which can effectively improve a subjective quality of the subtitle region of interest to human eyes.

Figure 6:
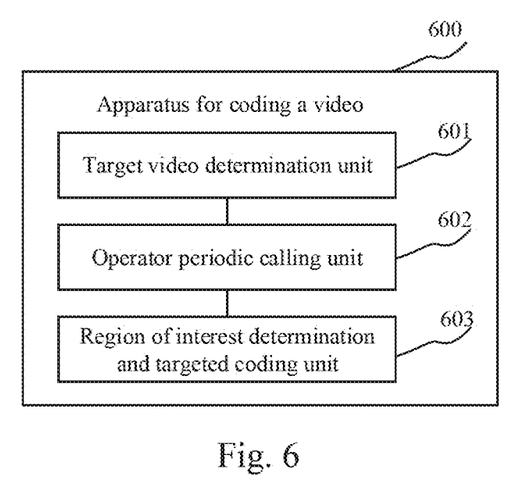
FIG. 6 is a structural block diagram of an apparatus for coding a video provided in an embodiment of the present disclosure.

With further reference to FIG. 6, as an implementation of the method shown in the above figures, the present disclosure provides an embodiment of an apparatus for coding a video, and the apparatus embodiment corresponds to the method embodiment shown in FIG. 2, the apparatus may be applied to various electronic devices.

As shown in FIG. 6, an apparatus 600 for coding a video in the present embodiment may include: a target video determination unit 601, an operator periodic calling unit 602, and a region of interest determination and targeted coding unit 603. The target video determination unit 601 is configured to determine a to-be-coded target video based on an acquired video coding request. The operator periodic calling unit 602 is configured to call, for each video frame arranged in chronological order constituting the target video, a preset subtitle detection operator periodically to detect subtitle information in the corresponding video frame; where, the subtitle detection operator is a neural network constructed based on a deep learning algorithm for recognizing the subtitle information in the video, the subtitle information including: a number of subtitle frames, a position of the subtitle frame, and subtitle content. The region of interest determination and targeted coding unit 603 is configured to determine a picture region for presenting the subtitle information as a region of interest, and perform coding processing according to a video coding method matching the region of interest.

In the present embodiment, in the apparatus 600 for coding a video, the specific processing and technical effects of the target video determination unit 601, the operator periodic calling unit 602, and the region of interest determination and targeted coding unit 603 may be referred to the relevant descriptions of steps 201-203 in the corresponding embodiment of FIG. 2, respectively, and detailed description thereof will be omitted.

In some alternative implementations of the present embodiment, the operator periodic calling unit 602 may include:

A first subtitle information obtaining subunit, configured to call the subtitle detection operator to detect to obtain first subtitle information appearing in a target video frame.

A subtitle content change detection subunit, configured to detect, after detecting the first subtitle information, periodically a change in the subtitle content in the corresponding video frame.

A calling abandonment subunit, configured to abandon, in response to no change in the subtitle content detected in a current period compared to the subtitle content detected in a previous period, calling the subtitle detection operator to detect the subtitle information in the current period.

A calling subunit, configured to call, in response to a change in the subtitle content detected in the current period compared to the subtitle content detected in the previous period, the subtitle detection operator to detect the subtitle information in the current period in the corresponding video frame to obtain new subtitle information.

In some alternative implementations of the present embodiment, the subtitle content change detection subunit may include:

A first subtitle content extraction module, configured to extract from the first subtitle information a first subtitle frame and first subtitle content appearing in a region framed by the first subtitle frame.

A change detection module, configured to detect whether the subtitle content appearing in the framed region within the first subtitle frame in the video frame corresponding to the current period has changed compared to the first subtitle content.

In some alternative implementations of the present embodiment, the change detection module may be further configured to:

Determine a first region image corresponding to the region framed by the first subtitle frame based on the first subtitle information.

Determine a second region image corresponding to the region framed by the first subtitle frame in the video frame corresponding to the current period.

Calculate a sum of absolute differences between the second region image and the first region image.

Determine, in response to the sum of absolute differences exceeding a preset threshold, that a new subtitle content appearing in the first subtitle frame in the video frame corresponding to the current period has changed compared to the first subtitle content.

Determine, in response to the sum of absolute differences not exceeding the preset threshold, that the new subtitle content appearing in the first subtitle frame in the video frame corresponding to the current period has not changed compared to the first subtitle content.

In some alternative implementations of the present embodiment, the period includes: every preset image frames or every preset duration is used as a period.

In some alternative implementations of the present embodiment, the apparatus 600 for coding a video may further include:

A first forcing calling unit, configured to force, in response to the number of times of consecutive abandoned calls to the subtitle detection operator exceeding a first preset number of times, to call the subtitle detection operator once to detect the subtitle information in a next period.

In some alternative implementations of the present embodiment, the apparatus 600 for coding a video may further include:

A second forcing calling unit, configured to force, in response to the number of subtitle frames detected by calling the subtitle detection operator in the current period being less than a maximum number of subtitle frames appearing in previous consecutive preset periods, to call the subtitle detection operator once to detect the subtitle information in a next period.

In some alternative implementations of the present embodiment, the apparatus 600 for coding a video may further include:

A consecutive no-subtitle scenario detection unit, configured to call, in response to no subtitle frame being detected by calling the subtitle detection operator in the current period and a maximum number of subtitle frames appearing in previous consecutive preset periods being zero, the subtitle detection operator once to detect the subtitle information every preset periods.

In some alternative implementations of the present embodiment, the region of interest determination and targeted coding unit 603 may include a targeted coding subunit configured to perform coding processing according to a video coding method matching the region of interest, and the targeted coding subunit may be further configured to:

Determine a high coding code rate exceeding a preset code rate pre-configured for the region of interest.

Perform coding processing on the region of interest according to the high coding code rate to obtain a region of interest coding result.

In some alternative implementations of the present embodiment, the apparatus 600 for coding a video may further include:

A low coding code rate determination unit, configured to determine a low coding code rate not exceeding the preset code rate pre-configured for a region of non-interest other than the region of interest.

A region of non-interest coding result acquisition unit, configured to perform coding processing on the region of non-interest according to the low coding code rate to obtain a region of non-interest coding result.

A coding result combination unit, configured to combine the corresponding region of interest coding result and the region of non-interest coding result according to a regional positional relationship between the region of interest and the region of non-interest.

The present embodiment serves as the apparatus embodiment corresponding to the method embodiment described above, and the apparatus for coding a video provided by the present embodiment, for the to-be-coded target video, does not call the subtitle detection operator constructed based on the neural network algorithm to perform high-accurate recognition and detection on the subtitle information in each video frame, but fully considers the timeliness and continuous existence of subtitle content presentation, and calls the subtitle detection operator periodically to detect the subtitle information presented in the current video frame using a spaced, frame-extracting method, thereby reducing unnecessary performance overhead caused by continuous and repeated calling the subtitle detection operator, which is conducive to freeing up more performance for targeted coding of the region presenting the subtitle information, thus enhancing the user's viewing experience during subsequent actual on-demand playback of the video.

According to an embodiment of the present disclosure, the present disclosure also provides an electronic device, including: at least one processor; and a memory, communicatively connected to the at least one processor; where, the memory stores instructions executable by the at least one processor, the instructions being executed by the at least one processor to enable the at least one processor to implement the method for coding a video as described in any of the above embodiments.

According to an embodiment of the present disclosure, the present disclosure also provides a readable storage medium storing a computer instruction, where, the computer instruction is used to cause the computer to implement the method for coding a video as described in any of the above embodiments.

According to an embodiment of the present disclosure, the present disclosure also provides a computer program product, the computer program product, when executed by a processor, is capable of implementing the method for coding a video as described in any of the above embodiments.

Figure 7:
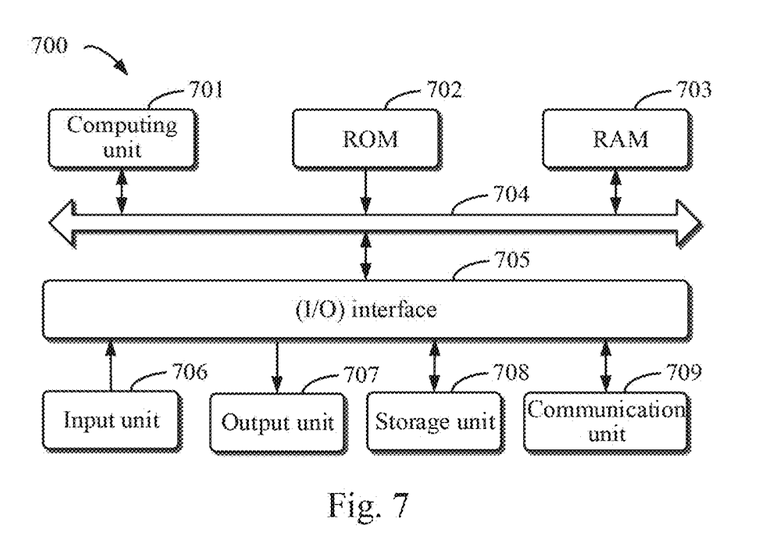
FIG. 7 is a schematic structural diagram of an electronic device suitable for performing the method for coding a video provided in an embodiment of the present disclosure.

FIG. 7 shows a schematic structural diagram of an example electronic device 700 that can be used to implement embodiments of the present disclosure. The electronic device is intended to represent various forms of digital computers, such as a laptop, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 7, the device 700 includes a computing unit 701, which may execute various appropriate actions and processes in accordance with a computer program stored in a read-only memory (ROM) 702 or a computer program loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the device 700 is connected to the I/O interface 705, including: an input unit 706, such as a keyboard and a mouse; an output unit 707, such as various types of displays and speakers; the storage unit 708, such as a magnetic disk and an optical disk; and a communication unit 709, such as a network card, a modem, and a wireless communication transceiver. The communication unit 709 allows the device 700 to exchange information/data with other devices via a computer network such as the Internet and/or various telecommunication networks.

The computing unit 701 may be various general-purpose and/or special-purpose processing components having a processing power and a computing power. Some examples of the computing unit 701 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, or the like. The computing unit 701 executes various methods and processes described above, such as the method for coding a video. For example, in some embodiments, the method for coding a video may be implemented as a computer software program that is tangibly included in a machine-readable medium, such as the storage unit 708. In some embodiments, some or all of the computer programs may be loaded and/or installed onto the device 700 via the ROM 702 and/or the communication unit 709. When the computer program is loaded into the RAM 703 and executed by the computing unit 701, one or more steps of the method for coding a video described above may be executed. Alternatively, in other embodiments, the computing unit 701 may be configured to perform the method for coding a video by any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in the cloud computing service system, to solve the defects of management difficulty and weak business scalability in traditional physical host and Virtual Private Server (VPS) service.

The technical solution according to embodiments of the present disclosure, for the to-be-coded target video, does not call the subtitle detection operator constructed based on the neural network algorithm to perform high-accurate recognition and detection on the subtitle information in each video frame, but fully considers the timeliness and continuous existence of subtitle content presentation, and calls the subtitle detection operator periodically to detect the subtitle information presented in the current video frame using a spaced, frame-extracting method, thereby reducing unnecessary performance overhead caused by continuous and repeated calling the subtitle detection operator, which is conducive to freeing up more performance for targeted coding of the region presenting the subtitle information, thus enhancing the user's viewing experience during subsequent actual on-demand playback of the video.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein. The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for coding a video, the method comprising:
determining a to-be-coded target video based on an acquired video coding request;
calling, for each video frame arranged in chronological order constituting the target video, a preset subtitle detection operator periodically to detect subtitle information in a corresponding video frame; wherein, the subtitle detection operator is a neural network constructed based on a deep learning algorithm for recognizing the subtitle information in a video, the subtitle information comprising: a number of subtitle frames, a position of the subtitle frames, and subtitle content; and determining a picture region for presenting the subtitle information as a region of interest, and performing coding processing according to a video coding method matching the region of interest, wherein, the calling, for each video frame arranged in chronological order constituting the target video, a preset subtitle detection operator periodically to detect subtitle information in a corresponding video frame, comprises: calling the subtitle detection operator to detect to obtain first subtitle information appearing in a target video frame; detecting, after detecting the first subtitle information, periodically a change in the subtitle content in the corresponding video frame; abandoning, in response to no change in the subtitle content detected in a current period compared to the subtitle content detected in a previous period, calling the subtitle detection operator to detect the subtitle information in the current period; and calling, in response to a change in the subtitle content detected in the current period compared to the subtitle content detected in the previous period, the subtitle detection operator to detect the subtitle information in the current period in the corresponding video frame to obtain new subtitle information.

2. The method according to claim 1, wherein, the detecting, after detecting the first subtitle information, periodically a change in the subtitle content in the corresponding video frame, comprises:
extracting from the first subtitle information a first subtitle frame and first subtitle content appearing in a region framed by the first subtitle frame; and
detecting whether the subtitle content appearing in the framed region within the first subtitle frame in the video frame corresponding to the current period has changed compared to the first subtitle content.

3. The method according to claim 2, wherein, the detecting whether the subtitle content appearing in the framed region within the first subtitle frame in the video frame corresponding to the current period has changed compared to the first subtitle content, comprises:
determining a first region image corresponding to the region framed by the first subtitle frame based on the first subtitle information;
determining a second region image corresponding to the region framed by the first subtitle frame in the video frame corresponding to the current period;
calculating a sum of absolute differences between the second region image and the first region image;
determining, in response to the sum of absolute differences exceeding a preset threshold, that a new subtitle content appearing in the first subtitle frame in the video frame corresponding to the current period has changed compared to the first subtitle content; and
determining, in response to the sum of absolute differences not exceeding the preset threshold, that the new subtitle content appearing in the first subtitle frame in the video frame corresponding to the current period has not changed compared to the first subtitle content.

4. The method according to claim 1, wherein the period comprises:
every preset image frame or every preset duration is used as a period.

5. The method according to claim 1, wherein the method further comprises: forcing, in response to a number of times of consecutive abandoned calls to the subtitle detection operator exceeding a first preset number of times, to call the subtitle detection operator once to detect the subtitle information in a next period.

6. The method according to claim 1, wherein the method further comprises: forcing, in response to a number of subtitle frames detected by calling the subtitle detection operator in the current period being less than a maximum number of subtitle frames appearing in previous consecutive preset periods, to call the subtitle detection operator once to detect the subtitle information in a next period.

7. The method according to claim 1, wherein the method further comprises: calling, in response to no subtitle frame being detected by calling the subtitle detection operator in the current period and a maximum number of subtitle frames appearing in previous consecutive preset periods being zero, the subtitle detection operator once to detect the subtitle information every preset periods.

8. The method according to claim 1, wherein the performing coding processing according to a video coding method matching the region of interest, comprises:
determining a high coding code rate exceeding a preset code rate pre-configured for the region of interest; and
performing coding processing on the region of interest according to the high coding code rate to obtain a region of interest coding result.

9. The method according to claim 8, wherein the method further comprises:
determining a low coding code rate not exceeding the preset code rate pre-configured for a region of non-interest other than the region of interest;
performing coding processing on the region of non-interest according to the low coding code rate to obtain a region of non-interest coding result; and
combining the corresponding region of interest coding result and the region of non-interest coding result according to a regional positional relationship between the region of interest and the region of non-interest.

10. An electronic device, comprising:
at least one processor; and
a memory, communicatively connected to the at least one processor; wherein,
the memory stores instructions executable by the at least one processor, the instructions being executed by the at least one processor to enable the at least one processor to perform operations for coding a video, the operations comprising:
determining a to-be-coded target video based on an acquired video coding request;
calling, for each video frame arranged in chronological order constituting the target video, a preset subtitle detection operator periodically to detect subtitle information in a corresponding video frame; wherein, the subtitle detection operator is a neural network constructed based on a deep learning algorithm for recognizing the subtitle information in a video, the subtitle information comprising: a number of subtitle frames, a position of the subtitle frames, and subtitle content; and determining a picture region for presenting the subtitle information as a region of interest, and performing coding processing according to a video coding method matching the region of interest, wherein, the calling, for each video frame arranged in chronological order constituting the target video, a preset subtitle detection operator periodically to detect subtitle information in a corresponding video frame, comprises: calling the subtitle detection operator to detect to obtain first subtitle information appearing in a target video frame; detecting, after detecting the first subtitle information, periodically a change in the subtitle content in the corresponding video frame; abandoning, in response to no change in the subtitle content detected in a current period compared to the subtitle content detected in a previous period, calling the subtitle detection operator to detect the subtitle information in the current period; and calling, in response to a change in the subtitle content detected in the current period compared to the subtitle content detected in the previous period, the subtitle detection operator to detect the subtitle information in the current period in the corresponding video frame to obtain new subtitle information.

11. A non-transitory computer readable storage medium storing a computer instruction, wherein, the computer instruction is used to cause the computer to perform operations for coding a video, the operations comprising:

determining a to-be-coded target video based on an acquired video coding request;

calling, for each video frame arranged in chronological order constituting the target video, a preset subtitle detection operator periodically to detect subtitle information in a corresponding video frame; wherein, the subtitle detection operator is a neural network constructed based on a deep learning algorithm for recognizing the subtitle information in a video, the subtitle information comprising: a number of subtitle frames, a position of the subtitle frames, and subtitle content; and determining a picture region for presenting the subtitle information as a region of interest, and performing coding processing according to a video coding method matching the region of interest, wherein, the calling, for each video frame arranged in chronological order constituting the target video, a preset subtitle detection operator periodically to detect subtitle information in a corresponding video frame, comprises:

calling the subtitle detection operator to detect to obtain first subtitle information appearing in a target video frame;

detecting, after detecting the first subtitle information, periodically a change in the subtitle content in the corresponding video frame;

abandoning, in response to no change in the subtitle content detected in a current period compared to the subtitle content detected in a previous period, calling the subtitle detection operator to detect the subtitle information in the current period; and calling, in response to a change in the subtitle content detected in the current period compared to the subtitle content detected in the previous period, the subtitle detection operator to detect the subtitle information in the current period in the corresponding video frame to obtain new subtitle information.

12. The electronic device according to claim 10, wherein, the detecting, after detecting the first subtitle information, periodically a change in the subtitle content in the corresponding video frame, comprises:

extracting from the first subtitle information a first subtitle frame and first subtitle content appearing in a region framed by the first subtitle frame; and detecting whether the subtitle content appearing in the framed region within the first subtitle frame in the video frame corresponding to the current period has changed compared to the first subtitle content.

13. The electronic device according to claim 12, wherein, the detecting whether the subtitle content appearing in the framed region within the first subtitle frame in the video frame corresponding to the current period has changed compared to the first subtitle content, comprises:

determining a first region image corresponding to the region framed by the first subtitle frame based on the first subtitle information;

determining a second region image corresponding to the region framed by the first subtitle frame in the video frame corresponding to the current period;

calculating a sum of absolute differences between the second region image and the first region image;

determining, in response to the sum of absolute differences exceeding a preset threshold, that a new subtitle content appearing in the first subtitle frame in the video frame corresponding to the current period has changed compared to the first subtitle content; and determining, in response to the sum of absolute differences not exceeding the preset threshold, that the new subtitle content appearing in the first subtitle frame in the video frame corresponding to the current period has not changed compared to the first subtitle content.

14. The electronic device according to claim 10, wherein the period comprises: every preset image frame or every preset duration is used as a period.

15. The electronic device according to claim 10, wherein the operations further comprise:

forcing, in response to a number of times of consecutive abandoned calls to the subtitle detection operator exceeding a first preset number of times, to call the subtitle detection operator once to detect the subtitle information in a next period.

16. The electronic device according to claim 10, wherein the operations further comprise:

forcing, in response to a number of subtitle frames detected by calling the subtitle detection operator in the current period being less than a maximum number of subtitle frames appearing in previous consecutive preset periods, to call the subtitle detection operator once to detect the subtitle information in a next period.

17. The electronic device according to claim 10, wherein the operations further comprise:

calling, in response to no subtitle frame being detected by calling the subtitle detection operator in the current period and a maximum number of subtitle frames appearing in previous consecutive preset periods being zero, the subtitle detection operator once to detect the subtitle information every preset periods.

18. The electronic device according to claim 10, wherein the performing coding processing according to a video coding method matching the region of interest, comprises:

determining a high coding code rate exceeding a preset code rate pre-configured for the region of interest; and performing coding processing on the region of interest according to the high coding code rate to obtain a region of interest coding result.

* * * * *